US008762238B2

(12) United States Patent  
Hahn-Carlson et al.

(10) Patent No.: US 8,762,238 B2  
(45) Date of Patent: Jun. 24, 2014

(54) RECURRING TRANSACTION PROCESSING SYSTEM AND APPROACH

(75) Inventors: Dean W. Hahn-Carlson, Lilydale, MN (US); Kevin M. Armstrong, Ham Lake, MN (US)

(73) Assignee: Syncada LLC, Minneapolis, MN (US)

( * ) Notice: Subject to any disclaimer, the term of this patent is extended or adjusted under 35 U.S.C. 154(b) by 1935 days.

(21) Appl. No.: 11/149,978

(22) Filed: Jun. 9, 2005

(65) Prior Publication Data

US 2005/0283434 A1 Dec. 22, 2005

Related U.S. Application Data

(63) Continuation-in-part of application No. 10/864,761, filed on Jun. 9, 2004, now Pat. No. 7,925,551.

(60) Provisional application No. 60/578,689, filed on Jun. 9, 2004, provisional application No. 60/578,429, filed on Jun. 9, 2004.

(51) Int. Cl.  
*G06Q 40/00* (2012.01)

(52) U.S. Cl.  
USPC .............................................. 705/35; 705/38

(58) Field of Classification Search  
USPC ...................................................... 705/35, 38  
See application file for complete search history.

(56) References Cited

U.S. PATENT DOCUMENTS

| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,507,778 A | 3/1985 | Tan |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A | 1/1989 | Shavit et al. |
| 4,926,325 A | 5/1990 | Benton et al. |

(Continued)

FOREIGN PATENT DOCUMENTS

| EP | 0339850 A2 | 2/1989 |
| EP | 0407026 A2 | 1/1991 |

(Continued)

OTHER PUBLICATIONS

Spencer et al., "JIT Systems and external logistics suppliers," International Journal of Operations & Production Management, v14, n6, pp. 60-74, 1994.

(Continued)

*Primary Examiner* — Rajesh Khattar  
(74) *Attorney, Agent, or Firm* — Shumaker & Sieffert, P.A.

(57) ABSTRACT

Transaction-based interactions are facilitated using recurring transaction processing approaches. According to an example embodiment of the present invention, recurring transactions are managed using rules applicable to parties to the transactions (e.g., as can be automatically associated with the recurring transactions based on information in the transactions and the rules). In this regard, transaction information is processed in accordance with rules characterizing the recurring nature of the transaction to which the information applies. Such transaction recurrence may be implemented, for example, using a cyclic, event-driven or other recurring type of condition. Payment related aspects of the transaction are also carried out based on the transaction processing and related recurring characteristics.

20 Claims, 4 Drawing Sheets

(56) References Cited

U.S. PATENT DOCUMENTS

| | | | |
|---|---|---|---|
| 4,949,272 A | 8/1990 | Vanourek et al. |
| 4,960,981 A | 10/1990 | Benton et al. |
| 4,992,940 A | 2/1991 | Dworkin |
| 4,995,112 A | 2/1991 | Aoyama |
| 4,996,662 A | 2/1991 | Cooper et al. |
| 5,008,827 A | 4/1991 | Sansone et al. |
| 5,017,766 A | 5/1991 | Tamada et al. |
| 5,025,372 A | 6/1991 | Burton et al. |
| 5,040,132 A | 8/1991 | Schuricht et al. |
| 5,043,908 A | 8/1991 | Manduley et al. |
| 5,054,096 A | 10/1991 | Beizer |
| 5,077,694 A | 12/1991 | Sansone et al. |
| 5,117,364 A | 5/1992 | Barns-Slavin et al. |
| 5,151,948 A | 9/1992 | Lyke |
| 5,153,842 A | 10/1992 | Dlugos, Sr. et al. |
| 5,159,667 A | 10/1992 | Borrey et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,238,349 A | 8/1993 | Grace, Sr. |
| 5,285,383 A | 2/1994 | Lindsey et al. |
| 5,293,310 A | 3/1994 | Carroll et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,483,445 A | 1/1996 | Pickering |
| 5,485,369 A | 1/1996 | Nicholls et al. |
| 5,500,513 A | 3/1996 | Langhans et al. |
| 5,631,821 A | 5/1997 | Muso |
| 5,631,827 A | 5/1997 | Nicholls et al. |
| 5,652,749 A | 7/1997 | Davenport et al. |
| 5,666,493 A | 9/1997 | Wojcik et al. |
| 5,671,362 A | 9/1997 | Cowe et al. |
| 5,677,955 A | 10/1997 | Doggett et al. |
| 5,694,334 A | 12/1997 | Donahue et al. |
| 5,694,551 A | 12/1997 | Doyle et al. |
| 5,699,528 A | 12/1997 | Hogan |
| 5,712,990 A | 1/1998 | Henderson |
| 5,717,989 A | 2/1998 | Tozzoli et al. |
| 5,719,771 A | 2/1998 | Buck et al. |
| 5,732,400 A | 3/1998 | Mandler |
| 5,754,854 A | 5/1998 | Kanamori et al. |
| 5,770,844 A | 6/1998 | Henn |
| 5,774,170 A | 6/1998 | Hite et al. |
| 5,790,790 A | 8/1998 | Smith et al. |
| 5,794,207 A | 8/1998 | Walker et al. |
| 5,799,286 A | 8/1998 | Morgan et al. |
| 5,806,063 A | 9/1998 | Dickens |
| 5,842,178 A | 11/1998 | Giovannoli |
| 5,845,283 A | 12/1998 | Williams |
| 5,870,719 A | 2/1999 | Maritzen et al. |
| 5,892,900 A | 4/1999 | Ginter et al. |
| 5,893,080 A | 4/1999 | McGurl et al. |
| 5,896,530 A | 4/1999 | White |
| 5,897,645 A | 4/1999 | Watters |
| 5,910,896 A | 6/1999 | Hahn-Carlson |
| 5,917,830 A | 6/1999 | Chen et al. |
| 5,918,216 A * | 6/1999 | Miksovsky et al. ............. 705/35 |
| 5,918,229 A | 6/1999 | Davis et al. |
| 5,920,847 A | 7/1999 | Kolling et al. |
| 5,924,082 A | 7/1999 | Silverman et al. |
| 5,924,089 A | 7/1999 | Silverman et al. |
| 5,930,363 A | 7/1999 | Stanford et al. |
| 5,931,917 A | 8/1999 | Nguyen et al. |
| 5,943,670 A | 8/1999 | Prager et al. |
| 5,956,690 A | 9/1999 | Haggerson et al. |
| 5,956,700 A | 9/1999 | Landry |
| 5,960,407 A | 9/1999 | Vivona |
| 5,970,475 A | 10/1999 | Barnes et al. |
| 5,973,475 A | 10/1999 | Schaffa et al. |
| 5,978,567 A | 11/1999 | Rebane et al. |
| 5,982,891 A | 11/1999 | Ginter et al. |
| 5,987,506 A | 11/1999 | Carter et al. |
| 5,991,728 A | 11/1999 | DeBusk et al. |
| 5,991,801 A | 11/1999 | Rebec et al. |
| 5,995,976 A | 11/1999 | Walker et al. |
| 6,012,041 A | 1/2000 | Brewer et al. |
| 6,016,477 A | 1/2000 | Ehnebuske et al. |
| 6,021,202 A | 2/2000 | Anderson et al. |
| 6,026,374 A | 2/2000 | Chess |
| 6,029,140 A | 2/2000 | Martin et al. |
| 6,029,150 A | 2/2000 | Kravitz |
| 6,043,819 A | 3/2000 | LeBrun et al. |
| 6,044,362 A | 3/2000 | Neely |
| 6,047,268 A | 4/2000 | Bartoli et al. |
| 6,055,519 A | 4/2000 | Kennedy et al. |
| 6,058,380 A | 5/2000 | Anderson et al. |
| 6,070,150 A | 5/2000 | Remington et al. |
| 6,085,200 A | 7/2000 | Hill et al. |
| 6,097,834 A | 8/2000 | Krouse et al. |
| 6,115,649 A | 9/2000 | Sakata |
| 6,115,711 A | 9/2000 | White |
| 6,119,163 A | 9/2000 | Montiero et al. |
| 6,128,602 A | 10/2000 | Northington et al. |
| 6,131,087 A | 10/2000 | Luke et al. |
| 6,141,653 A | 10/2000 | Conklin et al. |
| 6,151,588 A | 11/2000 | Tozzoli et al. |
| 6,157,924 A | 12/2000 | Austin |
| 6,167,378 A | 12/2000 | Webber, Jr. |
| 6,169,542 B1 | 1/2001 | Hooks et al. |
| 6,199,046 B1 | 3/2001 | Heinzle et al. |
| 6,204,763 B1 | 3/2001 | Sone |
| 6,209,095 B1 | 3/2001 | Anderson et al. |
| 6,223,168 B1 | 4/2001 | McGurl et al. |
| 6,236,972 B1 | 5/2001 | Shkedy |
| 6,246,994 B1 | 6/2001 | Wolven et al. |
| 6,254,000 B1 | 7/2001 | Degen et al. |
| 6,260,024 B1 | 7/2001 | Shkedy |
| 6,266,640 B1 | 7/2001 | Fromm et al. |
| 6,267,292 B1 | 7/2001 | Walker et al. |
| 6,275,813 B1 | 8/2001 | Berka |
| 6,285,916 B1 | 9/2001 | Kadaba et al. |
| 6,317,737 B1 | 11/2001 | Gorelik et al. |
| 6,323,894 B1 | 11/2001 | Katz et al. |
| 6,324,522 B2 | 11/2001 | Peterson et al. |
| 6,324,551 B1 | 11/2001 | Lamping et al. |
| 6,330,550 B1 | 12/2001 | Brisebois et al. |
| 6,338,044 B1 | 1/2002 | Cook et al. |
| 6,357,042 B2 | 3/2002 | Srinivasan et al. |
| 6,366,289 B1 | 4/2002 | Wallace |
| 6,381,587 B1 * | 4/2002 | Guzelsu ........................ 705/40 |
| 6,389,402 B1 | 5/2002 | Ginter et al. |
| 6,418,441 B1 | 7/2002 | Call |
| 6,421,691 B1 | 7/2002 | Kajitani |
| 6,442,533 B1 | 8/2002 | Hinkle |
| 6,477,510 B1 | 11/2002 | Johnson |
| 6,486,899 B1 | 11/2002 | Bush et al. |
| 6,490,567 B1 | 12/2002 | Gregory |
| 6,493,685 B1 | 12/2002 | Ensel et al. |
| 6,499,036 B1 | 12/2002 | Gurevich |
| 6,505,169 B1 | 1/2003 | Bhagavath et al. |
| 6,505,172 B1 | 1/2003 | Johnson et al. |
| 6,507,826 B1 * | 1/2003 | Maners ........................ 705/34 |
| 6,510,383 B1 | 1/2003 | Jones |
| 6,510,384 B2 | 1/2003 | Okano |
| 6,526,443 B1 | 2/2003 | Goldsmith et al. |
| 6,539,360 B1 | 3/2003 | Kadaba |
| 6,571,149 B1 | 5/2003 | Hahn-Carlson |
| 6,598,026 B1 | 7/2003 | Ojha et al. |
| 6,607,081 B2 | 8/2003 | Graef et al. |
| 6,629,081 B1 | 9/2003 | Cornelius et al. |
| 6,673,479 B2 | 1/2004 | McArthur et al. |
| 6,684,384 B1 | 1/2004 | Bickerton et al. |
| 6,687,713 B2 | 2/2004 | Mattson et al. |

(56) References Cited

U.S. PATENT DOCUMENTS

| | | |
|---|---|---|
| 6,697,702 B1 | 2/2004 | Hahn-Carlson |
| 6,704,612 B1 | 3/2004 | Hahn-Carlson |
| 6,721,613 B1 | 4/2004 | Yamamoto et al. |
| 6,721,715 B2 | 4/2004 | Nemzow |
| 6,741,968 B2 | 5/2004 | Jacoves et al. |
| 6,751,630 B1 | 6/2004 | Franks et al. |
| 6,785,661 B1 | 8/2004 | Mandler et al. |
| 6,789,252 B1 | 9/2004 | Burke et al. |
| 6,792,459 B2 | 9/2004 | Elnozahy et al. |
| 6,820,038 B1 | 11/2004 | Wetzer et al. |
| 6,829,590 B1 | 12/2004 | Greener et al. |
| 6,832,212 B1 | 12/2004 | Zenner et al. |
| 6,833,865 B1 | 12/2004 | Fuller et al. |
| 6,850,900 B1 | 2/2005 | Hare et al. |
| 6,873,963 B1 | 3/2005 | Westbury et al. |
| 6,873,997 B1 | 3/2005 | Majjasie et al. |
| 6,879,962 B1 | 4/2005 | Smith et al. |
| 6,882,983 B2 | 4/2005 | Furphy et al. |
| 6,882,986 B1 * | 4/2005 | Heinemann et al. ............ 705/40 |
| 6,889,194 B1 | 5/2005 | Kadaba |
| 6,895,438 B1 | 5/2005 | Ulrich |
| 6,915,268 B2 | 7/2005 | Riggs et al. |
| 6,937,922 B2 | 8/2005 | Benda et al. |
| 6,941,281 B1 | 9/2005 | Johnson |
| 6,944,595 B1 | 9/2005 | Graser et al. |
| 6,973,258 B1 | 12/2005 | Yoo et al. |
| 6,983,278 B1 | 1/2006 | Yu et al. |
| 6,988,111 B2 | 1/2006 | Chow et al. |
| 6,999,943 B1 | 2/2006 | Johnson et al. |
| 7,047,210 B1 | 5/2006 | Srinivasan |
| 7,054,841 B1 | 5/2006 | Tenorio |
| 7,069,234 B1 | 6/2006 | Cornelius et al. |
| 7,069,248 B2 | 6/2006 | Huber |
| 7,076,652 B2 | 7/2006 | Ginter et al. |
| 7,079,176 B1 | 7/2006 | Freeman et al. |
| 7,099,304 B2 | 8/2006 | Liu et al. |
| 7,110,959 B2 | 9/2006 | Hahn-Carlson |
| 7,110,979 B2 | 9/2006 | Tree |
| 7,113,964 B1 | 9/2006 | Bequet et al. |
| 7,117,170 B1 | 10/2006 | Bennett et al. |
| 7,120,871 B1 | 10/2006 | Harrington |
| 7,124,150 B2 | 10/2006 | Majjasie et al. |
| 7,130,822 B1 | 10/2006 | Their et al. |
| 7,131,069 B1 | 10/2006 | Rush et al. |
| 7,133,835 B1 | 11/2006 | Fusz et al. |
| 7,136,467 B2 | 11/2006 | Brockman et al. |
| 7,143,058 B2 | 11/2006 | Sugimoto et al. |
| 7,146,337 B1 | 12/2006 | Ward et al. |
| 7,149,744 B1 | 12/2006 | Tenorio |
| 7,162,458 B1 | 1/2007 | Flangan et al. |
| 7,177,836 B1 | 2/2007 | German et al. |
| 7,181,017 B1 | 2/2007 | Nagel et al. |
| 7,203,662 B2 | 4/2007 | Das et al. |
| 7,206,768 B1 | 4/2007 | DeGroeve et al. |
| 7,222,081 B1 | 5/2007 | Sone |
| 7,243,139 B2 | 7/2007 | Ullman et al. |
| 7,254,588 B2 | 8/2007 | Sung et al. |
| 7,257,560 B2 | 8/2007 | Jacobs et al. |
| 7,263,506 B2 | 8/2007 | Lee et al. |
| 7,324,976 B2 | 1/2008 | Gupta et al. |
| 7,327,952 B2 | 2/2008 | Enomoto |
| 7,340,433 B1 | 3/2008 | Kay et al. |
| 7,346,575 B1 | 3/2008 | Ahles et al. |
| 7,363,261 B2 | 4/2008 | Whitehead et al. |
| 7,366,684 B1 | 4/2008 | Douglas |
| 7,373,365 B2 | 5/2008 | Varadarajan et al. |
| 7,386,502 B1 | 6/2008 | Butcher, III |
| 7,392,934 B2 | 7/2008 | Hahn-Carlson et al. |
| 7,415,471 B1 | 8/2008 | Coleman |
| 7,415,617 B2 | 8/2008 | Ginter et al. |
| 7,433,845 B1 | 10/2008 | Flitcroft et al. |
| 7,437,310 B1 | 10/2008 | Dutta |
| 7,448,063 B2 | 11/2008 | Freeman et al. |
| 7,475,024 B1 | 1/2009 | Phan |
| 7,496,519 B2 | 2/2009 | Hahn-Carlson et al. |
| 7,499,875 B1 | 3/2009 | May et al. |
| 7,529,706 B2 | 5/2009 | Kulasooriya et al. |
| 7,536,354 B1 | 5/2009 | DeGroeve et al. |
| 7,536,362 B2 | 5/2009 | Starr et al. |
| 7,548,884 B1 | 6/2009 | Thomas |
| 7,558,793 B1 | 7/2009 | Topolovac et al. |
| 7,574,363 B2 | 8/2009 | Bodin |
| 7,574,386 B2 | 8/2009 | Hahn-Carlson et al. |
| 7,587,363 B2 | 9/2009 | Cataline et al. |
| 7,590,575 B2 | 9/2009 | Yu et al. |
| 7,617,146 B2 | 11/2009 | Keaton et al. |
| 7,627,499 B2 | 12/2009 | Hahn-Carlson |
| 7,634,455 B1 | 12/2009 | Keene et al. |
| 7,640,195 B2 | 12/2009 | Von Zimmermann et al. |
| 7,660,788 B1 | 2/2010 | Clark |
| 7,693,791 B2 | 4/2010 | Hahn-Carlson et al. |
| 7,702,563 B2 | 4/2010 | Balson et al. |
| 7,725,372 B2 | 5/2010 | Hahn-Carlson |
| 7,765,136 B2 | 7/2010 | Northington et al. |
| 7,822,653 B2 | 10/2010 | Hahn-Carlson et al. |
| 7,890,395 B2 | 2/2011 | Phelan |
| 7,925,551 B2 | 4/2011 | Hahn-Carlson et al. |
| 7,970,671 B2 | 6/2011 | Hahn-Carlson et al. |
| 8,050,938 B1 | 11/2011 | Green et al. |
| 8,060,410 B2 | 11/2011 | Hahn-Carlson |
| 8,069,054 B2 | 11/2011 | Hahn-Carlson et al. |
| 8,103,575 B1 | 1/2012 | Hinkle |
| 8,126,785 B2 | 2/2012 | Hahn-Carlson et al. |
| 8,266,024 B2 | 9/2012 | Hahn-Carlson et al. |
| 8,392,285 B2 | 3/2013 | Hahn-Carlson |
| 8,396,811 B1 | 3/2013 | Hahn-Carlson |
| 2001/0009002 A1 | 7/2001 | Logan et al. |
| 2001/0011241 A1 | 8/2001 | Nemzow |
| 2001/0014878 A1 | 8/2001 | Mitra |
| 2001/0025262 A1 | 9/2001 | Ahmed |
| 2001/0032154 A1 | 10/2001 | Schlummer |
| 2001/0032171 A1 | 10/2001 | Brink et al. |
| 2001/0032183 A1 | 10/2001 | Landry |
| 2001/0039522 A1 | 11/2001 | Saxon |
| 2001/0047311 A1 | 11/2001 | Singh |
| 2001/0056395 A1 | 12/2001 | Khan |
| 2002/0007302 A1 | 1/2002 | Work et al. |
| 2002/0016765 A1 | 2/2002 | Sacks et al. |
| 2002/0026374 A1 | 2/2002 | Moneymaker et al. |
| 2002/0032649 A1 * | 3/2002 | Selvarajan ..................... 705/40 |
| 2002/0035488 A1 | 3/2002 | Aquila et al. |
| 2002/0038277 A1 | 3/2002 | Yuan |
| 2002/0038305 A1 | 3/2002 | Bahl et al. |
| 2002/0040304 A1 | 4/2002 | Shenoy et al. |
| 2002/0042782 A1 | 4/2002 | Albazz et al. |
| 2002/0046081 A1 | 4/2002 | Albazz et al. |
| 2002/0046125 A1 | 4/2002 | Speicher et al. |
| 2002/0046147 A1 | 4/2002 | Livesay et al. |
| 2002/0046169 A1 * | 4/2002 | Keresman et al. ............... 705/41 |
| 2002/0048369 A1 | 4/2002 | Ginter et al. |
| 2002/0049622 A1 | 4/2002 | Lettich et al. |
| 2002/0055850 A1 | 5/2002 | Powell et al. |
| 2002/0059122 A1 | 5/2002 | Inoue et al. |
| 2002/0059134 A1 | 5/2002 | Ebbs et al. |
| 2002/0062278 A1 | 5/2002 | Ingram et al. |
| 2002/0065736 A1 | 5/2002 | Willner et al. |
| 2002/0065738 A1 | 5/2002 | Riggs et al. |
| 2002/0069177 A1 | 6/2002 | Carrott et al. |
| 2002/0072956 A1 | 6/2002 | Willems et al. |
| 2002/0077978 A1 | 6/2002 | O'Leary et al. |
| 2002/0087344 A1 | 7/2002 | Billings et al. |
| 2002/0087455 A1 | 7/2002 | Tsagarakis |
| 2002/0095355 A1 | 7/2002 | Walker et al. |
| 2002/0103661 A1 | 8/2002 | Albazz et al. |
| 2002/0107761 A1 | 8/2002 | Kark et al. |
| 2002/0107794 A1 | 8/2002 | Furphy et al. |
| 2002/0111886 A1 | 8/2002 | Chenevich et al. |
| 2002/0116288 A1 | 8/2002 | Nakajima |
| 2002/0116334 A1 | 8/2002 | Bennett et al. |
| 2002/0116348 A1 | 8/2002 | Phillips et al. |
| 2002/0120570 A1 | 8/2002 | Loy |
| 2002/0123919 A1 | 9/2002 | Brockman et al. |
| 2002/0123973 A1 | 9/2002 | Eccles et al. |
| 2002/0143858 A1 | 10/2002 | Teague et al. |

(56) References Cited

U.S. PATENT DOCUMENTS

| | | |
|---|---|---|
| 2002/0147655 A1 | 10/2002 | Say |
| 2002/0156797 A1 | 10/2002 | Lee et al. |
| 2002/0161719 A1 | 10/2002 | Manning et al. |
| 2002/0174034 A1 | 11/2002 | Au et al. |
| 2002/0184527 A1 | 12/2002 | Chun et al. |
| 2002/0194174 A1* | 12/2002 | Calkins et al. .................... 707/6 |
| 2002/0198829 A1 | 12/2002 | Ludwig et al. |
| 2002/0198833 A1 | 12/2002 | Wohlstadter |
| 2003/0004823 A1 | 1/2003 | Sagy |
| 2003/0005876 A1 | 1/2003 | Boswell |
| 2003/0014325 A1 | 1/2003 | Biffar et al. |
| 2003/0018563 A1 | 1/2003 | Kilgour et al. |
| 2003/0026404 A1 | 2/2003 | Joyce et al. |
| 2003/0033205 A1 | 2/2003 | Nowers et al. |
| 2003/0033240 A1 | 2/2003 | Balson et al. |
| 2003/0041008 A1 | 2/2003 | Grey et al. |
| 2003/0046089 A1 | 3/2003 | Menninger et al. |
| 2003/0050876 A1 | 3/2003 | Tawara et al. |
| 2003/0055675 A1 | 3/2003 | Twennaar |
| 2003/0055779 A1 | 3/2003 | Wolf |
| 2003/0055783 A1 | 3/2003 | Cataline et al. |
| 2003/0074206 A1 | 4/2003 | Hoffman et al. |
| 2003/0074298 A1 | 4/2003 | Daum |
| 2003/0093320 A1 | 5/2003 | Sullivan |
| 2003/0097318 A1 | 5/2003 | Yu et al. |
| 2003/0115129 A1 | 6/2003 | Feaver |
| 2003/0117446 A1 | 6/2003 | Esposito-Ross et al. |
| 2003/0126047 A1 | 7/2003 | Hollar et al. |
| 2003/0135425 A1 | 7/2003 | Leavitt |
| 2003/0135435 A1 | 7/2003 | Aharoni |
| 2003/0139985 A1 | 7/2003 | Hollar et al. |
| 2003/0144901 A1 | 7/2003 | Coulter et al. |
| 2003/0149674 A1 | 8/2003 | Good et al. |
| 2003/0154163 A1 | 8/2003 | Phillips et al. |
| 2003/0158811 A1 | 8/2003 | Sanders et al. |
| 2003/0163431 A1 | 8/2003 | Ginter et al. |
| 2003/0187796 A1 | 10/2003 | Swift et al. |
| 2003/0191711 A1 | 10/2003 | Jamison et al. |
| 2003/0195815 A1 | 10/2003 | Li et al. |
| 2003/0200172 A1 | 10/2003 | Randle |
| 2003/0200185 A1 | 10/2003 | Huerta et al. |
| 2003/0212617 A1 | 11/2003 | Stone et al. |
| 2003/0220863 A1 | 11/2003 | Holm et al. |
| 2003/0225883 A1 | 12/2003 | Greaves et al. |
| 2003/0233252 A1 | 12/2003 | Haskell et al. |
| 2003/0233286 A1 | 12/2003 | Hahn-Carlson et al. |
| 2003/0233292 A1 | 12/2003 | Richey et al. |
| 2003/0233321 A1 | 12/2003 | Scolini et al. |
| 2004/0010463 A1 | 1/2004 | Hahn-Carlson |
| 2004/0019562 A1 | 1/2004 | Viberg |
| 2004/0034578 A1* | 2/2004 | Oney et al. ...................... 705/28 |
| 2004/0039696 A1 | 2/2004 | Harmon et al. |
| 2004/0049446 A1 | 3/2004 | Seljeseth |
| 2004/0068431 A1 | 4/2004 | Smith et al. |
| 2004/0095237 A1 | 5/2004 | Chen et al. |
| 2004/0098350 A1 | 5/2004 | Labrou et al. |
| 2004/0098663 A1 | 5/2004 | Rey et al. |
| 2004/0107123 A1 | 6/2004 | Haffner et al. |
| 2004/0107125 A1 | 6/2004 | Guheen et al. |
| 2004/0117383 A1 | 6/2004 | Lee et al. |
| 2004/0123129 A1 | 6/2004 | Ginter et al. |
| 2004/0139032 A1 | 7/2004 | Rowan |
| 2004/0153389 A1 | 8/2004 | Lortscher |
| 2004/0153403 A1 | 8/2004 | Sadre |
| 2004/0153407 A1 | 8/2004 | Club et al. |
| 2004/0158510 A1 | 8/2004 | Fisher |
| 2004/0172360 A1 | 9/2004 | Mabrey et al. |
| 2004/0172368 A1 | 9/2004 | Johnson et al. |
| 2004/0181468 A1 | 9/2004 | Harmon et al. |
| 2004/0184163 A1 | 9/2004 | Nishioka et al. |
| 2004/0186806 A1 | 9/2004 | Sinclair et al. |
| 2004/0187075 A1 | 9/2004 | Maxham et al. |
| 2004/0201074 A1 | 10/2004 | Khandros et al. |
| 2004/0225574 A1 | 11/2004 | Arnold et al. |
| 2004/0230536 A1 | 11/2004 | Fung et al. |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2004/0260634 A1 | 12/2004 | King et al. |
| 2005/0015332 A1 | 1/2005 | Chen |
| 2005/0021363 A1 | 1/2005 | Stimson et al. |
| 2005/0021527 A1 | 1/2005 | Zhang et al. |
| 2005/0027613 A1 | 2/2005 | Takekuma et al. |
| 2005/0027651 A1 | 2/2005 | DeVault et al. |
| 2005/0033660 A1 | 2/2005 | Solomon |
| 2005/0033760 A1 | 2/2005 | Fuller et al. |
| 2005/0055306 A1 | 3/2005 | Miller et al. |
| 2005/0075964 A1 | 4/2005 | Quinn et al. |
| 2005/0119980 A1 | 6/2005 | Kohavi et al. |
| 2005/0125260 A1 | 6/2005 | Green et al. |
| 2005/0131839 A1 | 6/2005 | Cordery et al. |
| 2005/0137947 A1 | 6/2005 | Schaub et al. |
| 2005/0149378 A1 | 7/2005 | Cyr et al. |
| 2005/0165699 A1 | 7/2005 | Hahn-Carlson |
| 2005/0177435 A1 | 8/2005 | Lidow |
| 2005/0177507 A1 | 8/2005 | Bandych et al. |
| 2005/0192896 A1 | 9/2005 | Hutchison et al. |
| 2005/0216368 A1 | 9/2005 | Wechsel |
| 2005/0234820 A1 | 10/2005 | MacKouse et al. |
| 2005/0240592 A1 | 10/2005 | Mamou et al. |
| 2005/0246192 A1 | 11/2005 | Jauffred et al. |
| 2005/0251478 A1 | 11/2005 | Yanavi |
| 2005/0256802 A1 | 11/2005 | Ammermann et al. |
| 2005/0274792 A1 | 12/2005 | Hahn-Carlson et al. |
| 2005/0278220 A1 | 12/2005 | Hahn-Carlson et al. |
| 2005/0278221 A1 | 12/2005 | Hahn-Carlson et al. |
| 2005/0278244 A1 | 12/2005 | Yuan |
| 2005/0278251 A1 | 12/2005 | Hahn-Carlson |
| 2005/0278255 A1 | 12/2005 | Hahn-Carlson et al. |
| 2005/0283437 A1 | 12/2005 | McRae et al. |
| 2005/0289023 A1 | 12/2005 | Hahn-Carlson et al. |
| 2005/0289024 A1 | 12/2005 | Hahn-Carlson et al. |
| 2006/0004670 A1 | 1/2006 | McKenney et al. |
| 2006/0010058 A1 | 1/2006 | D'Hers et al. |
| 2006/0015454 A1 | 1/2006 | Hahn-Carlson |
| 2006/0036476 A1 | 2/2006 | Klem |
| 2006/0041487 A1 | 2/2006 | Santalo et al. |
| 2006/0116957 A1 | 6/2006 | May et al. |
| 2006/0167762 A1 | 7/2006 | Hahn-Carlson |
| 2006/0167791 A1 | 7/2006 | Hahn-Carlson |
| 2006/0167792 A1 | 7/2006 | Hahn-Carlson |
| 2006/0233334 A1 | 10/2006 | Bingaman et al. |
| 2006/0287983 A1 | 12/2006 | Chauhan |
| 2007/0022021 A1 | 1/2007 | Walker et al. |
| 2007/0055582 A1 | 3/2007 | Hahn-Carlson |
| 2007/0136278 A1 | 6/2007 | Grazioli et al. |
| 2007/0156584 A1 | 7/2007 | Barnes et al. |
| 2007/0192178 A1 | 8/2007 | Fung et al. |
| 2007/0208635 A1 | 9/2007 | Van Luchene et al. |
| 2007/0214065 A1 | 9/2007 | Kahlon et al. |
| 2007/0214077 A1 | 9/2007 | Barnes et al. |
| 2007/0246528 A1 | 10/2007 | Kubo et al. |
| 2007/0262140 A1 | 11/2007 | Long |
| 2007/0271160 A1 | 11/2007 | Stone et al. |
| 2007/0282724 A1 | 12/2007 | Barnes et al. |
| 2007/0282744 A1 | 12/2007 | Barnes et al. |
| 2007/0299769 A1 | 12/2007 | Fowler et al. |
| 2008/0082374 A1 | 4/2008 | Kennis et al. |
| 2008/0086396 A1 | 4/2008 | Hahn-Carlson |
| 2008/0103972 A1 | 5/2008 | Lanc |
| 2008/0172314 A1 | 7/2008 | Hahn-Carlson |
| 2008/0215456 A1 | 9/2008 | West et al. |
| 2008/0249940 A1 | 10/2008 | Hahn-Carlson et al. |
| 2008/0281752 A1 | 11/2008 | Chien |
| 2009/0171727 A1 | 7/2009 | Hahn-Carlson |
| 2009/0192922 A1 | 7/2009 | Hahn-Carlson |
| 2009/0259576 A1 | 10/2009 | Hahn-Carlson |
| 2009/0265274 A1 | 10/2009 | Hahn-Carlson et al. |
| 2009/0287590 A1 | 11/2009 | Hahn-Carlson |
| 2009/0287598 A1 | 11/2009 | Hahn-Carlson |
| 2009/0292630 A1 | 11/2009 | Hahn-Carlson et al. |
| 2009/0307114 A1 | 12/2009 | Hahn-Carlson |
| 2010/0017315 A1 | 1/2010 | Hahn-Carlson |
| 2010/0049650 A1 | 2/2010 | Keaton et al. |

(56) References Cited

U.S. PATENT DOCUMENTS

| | | |
|---|---|---|
| 2010/0070397 A1 | 3/2010 | Hahn-Carlson et al. |
| 2010/0138325 A1 | 6/2010 | Hahn-Carlson |
| 2010/0185540 A1 | 7/2010 | Hahn-Carlson et al. |
| 2010/0205054 A1 | 8/2010 | Hahn-Carlson et al. |
| 2011/0004544 A1 | 1/2011 | Baum |
| 2011/0029404 A1 | 2/2011 | Hahn-Carlson et al. |
| 2012/0158558 A1 | 6/2012 | Hahn-Carlson et al. |

FOREIGN PATENT DOCUMENTS

| | | |
|---|---|---|
| EP | 0425421 A2 | 5/1991 |
| EP | 0779587 A2 | 6/1997 |
| EP | 1659526 A2 | 5/2006 |
| FR | 2543327 A1 | 9/1984 |
| GB | 2398894 | 9/2004 |
| JP | 2001312680 A | 11/2001 |
| WO | WO 97/07468 A1 | 2/1997 |
| WO | WO 99/08218 A1 | 2/1999 |
| WO | WO 00/62225 A1 | 10/2000 |
| WO | WO 01/09782 A2 | 2/2001 |
| WO | WO 01/35570 A1 | 5/2001 |
| WO | WO 01/48659 A1 | 7/2001 |
| WO | WO 0182193 | 11/2001 |
| WO | WO 0188813 | 11/2001 |
| WO | WO 01/26017 A2 | 12/2001 |
| WO | WO 02/21405 A1 | 3/2002 |
| WO | WO 02/06920 A2 | 9/2002 |
| WO | WO 03/034178 A2 | 4/2003 |
| WO | WO 2005/124635 A2 | 12/2005 |
| WO | WO 2006/071881 A2 | 7/2006 |
| WO | WO 2008/045793 A1 | 4/2008 |

OTHER PUBLICATIONS

White, How Computers Work, Sep. 1999, 93 pp.

Professional Builder (1993) www.highbeam.com, Contracts & Law: Part III 8 pp.

South China Morning Post, Hong Kong, Buying "Products over the Net," Jul. 2000, 2 pp.

Xcitek Press Release, "U.S. Bank Selects Xcitek for Corporate Actions Data and XSP for Corporate Actions Automation," NY, NY, Dec. 2003, 1 pp.

Berhad, "Fueling financial oil for the economy," The New Straits Times Press (Malaysia), Dec. 10, 2001, 3 pp.

Singh, "A new road to recovery," Risk, pp. 108-110, Sep. 2004.

"Credit Derivatives and Mortgage-backed Bonds in Capital Adequacy Requirements for Market Risk," http://www.rahoitustarkastus.fi/Eng/Regulation/FSA_standards/FSA_interpretations/4_2005.html, Apr. 2005, 5 pp.

Brochure: SAP Supplier Relationship Management—At a Glance, SAP, 2003, 16 pp.

Brochure: Self-Service Procurement: Slashing Costs and Saving Time, SAP, 2003, 12 pp.

Electronic Commerce News, "Sarbanes-Oxley Continue to be Key Issue in Corporate Payments Space," Sep. 1, 2003, v8, issue 18, 7 pp.

Fletcher, "Limits on reinsurance offsets sought by California regulator," Business Insurance, May 8, 1995 4 pp.

Denver Business Wire, "Jd Edwards Continues to drive network-centric applications delivery with OneWorld enhancements," Jun. 16, 1997, p. 06160089.

Notice from the European Patent Office concerning business methods, dated Oct. 1, 2007, 2 pp.

Egan, "Administrative Orders from the Office of the Governor of Alaska," Jul. 18, 1972, 3 pp. http://www.gov.state.ak.us/admin-orders/018.html.

Bodnar, "Estimating Exchange Rate Exposure: Issues in Model Structure," Financial Management v32, n1, pp. 35-67, 2003.

Plewka, "Germany seizes the Emu initiative," International Tax Review, v8, n5, pp. 43-46, May 1997.

Huang, "Exchange Risk and Exchange Rate Pass-Through," v67/02-A of Dissertation Abstracts International, 2005.

McKeefry, "Seeking microcontrollers desperately," Electronic Buyers News, n972, Sep. 11, 1995, 6 pp.

Mallory, Great Plains Accounting v.7 (Great Plains Software's accounting software) (Product Announcement), Apr. 22, 1993, 3 pp.

Russell, "Kitting out is now in (Use of component kits is expanding as distributors develop added-value activities)," Electronic Times (online), n 852, Apr. 17, 1997, 4 pp.

* cited by examiner

RECURRING TRANSACTION PROCESSING SYSTEM AND APPROACH

RELATED PATENT DOCUMENTS

This patent document claims priority under 35 U.S.C. §119 to U.S. Provisional Patent Application Nos. 60/578,689 and 60/578,429, respectively entitled "Automated Cyclic Transaction Processing System and Approach" and "Automated Transaction Processing System and Approach," both filed on Jun. 9, 2004; this application is a continuation-in-part of U.S. patent application Ser. No. 10/864,761, entitled "Automated Transaction Processing System and Approach," also filed on Jun. 9, 2004.

FIELD OF THE INVENTION

The present invention is directed to transaction processing and, more specifically, to the processing and management of recurring transactions involving goods and/or services.

BACKGROUND

Transaction processing has typically involved intensive manual effort and, in instances where automatic processing has been used, intensive user intervention. For example, many transaction processes involve the use of a variety of different types of transaction documents such as orders, invoices, receipts and bills of lading (BOL). These types of transaction documents include information associated with the transaction and used by parties to the transaction to monitor and process the transaction. Many of these and other types of transactions occur on a cyclic or other recurring basis, with elements to the transaction that repeat. While repetitive in nature, certain elements of transactions, such as delivery confirmation and payment, are typically addressed on an individual transaction cycle or period basis.

Cyclic and other recurring transaction documents are electronically processed for a multitude of different types of applications. Interaction data (e.g., electronic or physical documents) describing characteristics of a particular transaction is often encountered in varied temporal order at transaction locations that assemble these documents into logical packages for automated processing. For example, there are often multiple parties to the transaction in addition to the common buyer and seller, such as shippers, financial institutions, distributors and regulatory agencies (e.g., customs, taxation agencies). Each of these parties often provides one or more different types of documents that relate to the transaction, and provides these documents at different times. For instance, an invoice may be sent for a cyclic transaction prior to goods or services for the transaction being accepted. Moreover, the quantity of items for certain cyclic transactions widely vary over time, with associated changes in billing and inventory needing to be made. In addition, different parties to a cyclic transaction often use unique accounting-type data, with automated processing limited to specific transaction parties or specific transaction interactions, with little flexibility.

Many cyclic transactions rely upon control data for controlling many different aspects of the transaction. Transaction terms such as those relating to the quantity of goods and/or services, the price per unit of goods and/or services, delivery conditions, payment terms and more are generally set before the transaction is executed and upon a transaction-by-transaction basis. When changes to transaction terms are made, related data must be updated. At times, these changes require changes for two or more parties to the transaction, with interaction required to adequately address the changes. Thus, when a user makes changes to transaction terms, manual interaction between the user and other parties to the transaction is typically required to ensure that the changes are made for all parties.

Another type of incompatibility that has made cyclic transaction processing difficult is related to the common scenario wherein reference numbers or codes used by different parties are not compatible. For example, in transactions involving buyers and sellers, sellers maintain transaction data organized using their own reference numbers or codes. Buyers typically must access the data using a seller's reference number or codes rather than the buyer's reference number. In addition, buyers and sellers typically use different reference numbers or codes for different characteristics of the transaction, making the monitoring and management of recurring transactions difficult. In particular, where changes are made to recurring transactions, as is more likely over time as relative, for example, to one-time transactions, those changes are difficult to monitor and respond to.

Payment and billing related aspects of traditional recurring transactions are particularly susceptible to billing errors and fraud. For example, there is often little to no connection between the delivery of goods and the billing for the delivery and/or the goods, or no connection between different types of accounting information used for related delivery and billing purposes. This may result in double billing, no billing at all, or overbilling. Auditing errors that cause incorrect billing or payment may also occur. In addition, payment can often be delayed while aspects of a particular transaction are being audited and/or disputed, particularly when different transaction documents must be manually parsed and processed. In addition, when the terms of a recurring transaction are changed, the implementation of those changes is often difficult to address for ensuring proper payment and billing. Delay associated with billing reduces working capital resources for parties to the transaction waiting for payment. Moreover, as time passes, payment events such as payment initiation and termination events may vary in occurrence and type.

Additional costs also arise as a result of existing inefficiencies in a variety of recurring transaction-processing approaches. Many of the costs are individually small, but very large in the aggregate. For example, typical parties to transactions incur administrative costs including those relating to creating and delivering transaction documents, resolving billing disputes, providing a signed copy of documents to other parties and posting accounts receivable. In addition, the cost of parsing, recognizing and categorizing documents related to these and other items add to the administrative costs of transactions.

An additional challenge to transaction management is related to the inability to obtain immediate information regarding a transaction. Transaction data from one party is typically not readily available to other transaction parties without direct access to private-party systems. Since the process of interacting and sharing data for transaction management is largely conducted manually, it is very difficult to track a transaction and real-time data is particularly difficult to come by. For example, there are various manual steps involved in order to learn of the status of performance or payment for a recurring transaction.

The above and other difficulties associated with the management and coordination of transactions have presented challenges to transaction processing, and in particular, to the processing of recurring transactions with the various unique aspects related thereto.

SUMMARY

The present invention is directed to overcoming the above-mentioned challenges and others related to the types of approaches and implementations discussed above and in other applications involving recurring transactions. The present invention is exemplified in a number of implementations and applications, some of which are summarized below.

According to an example embodiment of the present invention, recurring transactions are managed using an approach generally involving the use of transaction information for processing payment-related aspects of the recurring transactions.

In a more particular example embodiment of the present invention, cyclic or other recurring-type characteristics assigned to a particular transaction using data based rules are used to process transaction data. When transaction data is received, the data is associated with transaction data based rules using information received with the transaction data. This association is used to identify (e.g., assign) recurring characteristics to use in processing the transaction data, such as for payment-related aspects of the transaction to which the data applies. These payment-related aspects may involve, for example, a payment initiation (e.g., on a recurring cycle) and a payment termination (e.g., at the completion of recurring cycles).

In another example embodiment of the present invention, a transaction-processing system is adapted for managing a plurality of recurring transactions involving merchant offerings among parties including buyers and sellers. The system includes a transaction databank arrangement that implements one or more data storage devices at one or more distinct locations and that is adapted to store information for recurring transactions between buyers and sellers. The stored information generally includes data associated with conditions of the recurring transaction upon which payment is authorized or otherwise facilitated. A transaction processor is adapted to receive transaction-based data from parties to a transaction and, for each particular recurring transaction, to associate transaction-based data with conditions of the recurring transaction upon which payment is authorized. Using the associated conditions, the transaction processor facilitates payment for each transaction. In some applications, the transaction processor further updates the transaction databank arrangement with billed quantities for the recurring transaction, reflecting a quantity or other characteristic of goods and/or services associated with the recurring transaction as indicated in the received transaction-based data.

According to another example embodiment of the present invention a transaction-processing system processes recurring transactions involving merchant offerings among parties including buyers and sellers. The system includes a transaction databank and a computer (processing) arrangement that interacts with the transaction databank for processing the transactions. The databank, implemented in a single or distributed arrangement, is adapted to store information for a plurality of recurring transactions between buyers and sellers. The stored information includes data associated with conditions of each recurring transaction between a buyer and a seller and upon which conditions payment for invoices can be selectively authorized on behalf of the buyer for each transaction. The computer arrangement is adapted to receive transaction data, audit payment of an invoice, authorize payment and update stored data for each particular recurring transaction. The received transaction-based data generally pertains to buyer and seller parties participating in the particular recurring transaction, with information including conditions upon which payment for invoices can be selectively authorized for the particular recurring transaction, which is stored in the transaction databank. The computer arrangement audits payment of an invoice for the particular recurring transaction as a function of data in the invoice and stored data that specifies conditions of the particular recurring transaction upon which payment can be authorized. The computer arrangement authorizes payment as a function of the audit, e.g., in response to the audit indicating that the recurring transaction is ripe for payment (e.g., payment is not premature) and/or that payment is appropriate based on conditions such as the quantity or merchant offerings that are the subject of the payment. Once payment is authorized, data characterizing billed quantities for the recurring transaction are updated in the transaction databank arrangement to include a billed quantity in the invoice for which payment is authorized.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
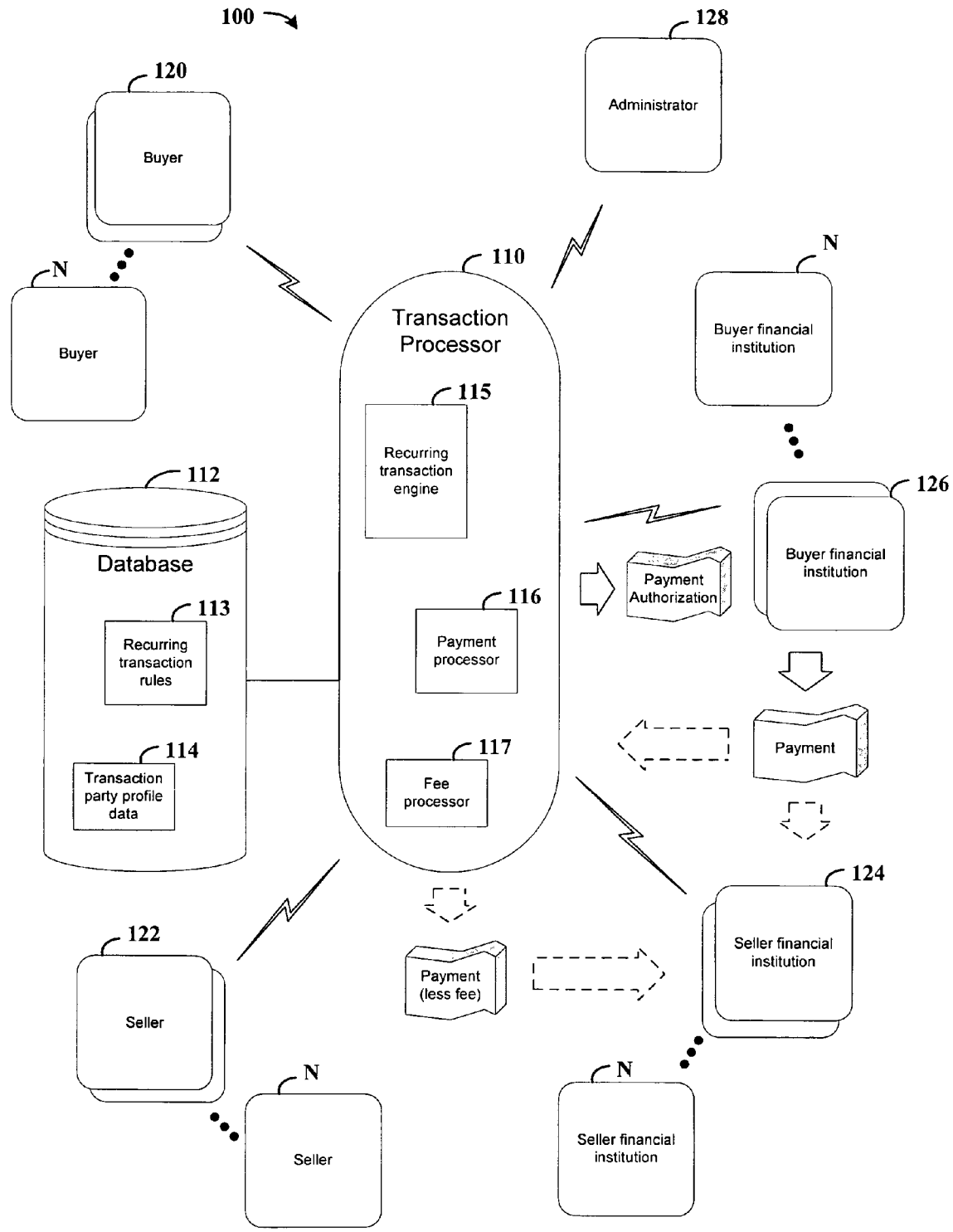
FIG. 1 shows a transaction processing arrangement, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of approaches and interactions, and has been found to be particularly useful for applications involving the processing of recurring transactions and related aspects thereof. While the present invention is not necessarily limited to such approaches, various aspects of the invention may be appreciated through a discussion of various examples using these and other contexts.

According to an example embodiment of the present invention, a transaction management system uses stored recurring transaction information to manage a transaction involving the exchange of merchant offerings (e.g., goods and/or services) between a buyer and a seller. Payment for the transaction is automatically audited and authorized as a function of the stored recurring transaction information. Upon receipt of invoice-type data (e.g., via an electronic document or other data transfer approach), the invoice-type data is parsed and associated with a particular recurring transaction. The invoice-type data may be generated, for example, by a party to the transaction or automatically (e.g., by the transaction management system) as defined by programming and stored recurring transaction rules. Item quantities such as goods and/or services associated with the invoice-type data are compared with stored recurring transaction characteristics to determine a payment-related condition. The payment-related condition is then used to determine whether the payment should be made and/or whether conditions relating to the payment such as timing and amount (known and/or estimated) should be taken into consideration. For instance, the transaction management system can be programmed to automatically authorize payment (partial or full) for the transaction when the payment-related condition meets selected criteria. If an invoice is premature (i.e., before a contracted payment date), the invoice can be stored for processing once the payment matures. With this approach, a multitude of types of recurring transactions can be automatically managed.

In one implementation, the transaction management system is configured to manage term characteristics of the recurring transaction. For example, the life and frequency of a particular recurring transaction can be managed using fixed and/or variable type data. Fixed data relating to specific times or time periods can be programmed into the transaction management system. Variable data such as conditions life or term related data can also be programmed into the transaction management system (e.g., the life of a recurring transaction expires after a selected quantity of goods and/or services are rendered).

As another example, transaction events such as a payment initiation event or payment termination event can be used to trigger term characteristics of the transaction. For instance, where a particular recurring transaction is to be carried out on a specified cycle for a set time period, a payment initiation event can be used to start the time period. A payment initiation event can also be used to start other functions, such as tracking functions for quantity of goods and/or services rendered. Payment termination events can similarly be used to trigger other term characteristics of the transaction, such as by ending the transaction with a payment termination event. For instance, a payment flagged as a final payment, or a payment that results in a total amount for a particular transaction having been satisfied, such as for a loan, can be used as an indication that a particular transaction should be ended.

In another example embodiment, payment is authorized in accordance with one or more conditions of delivery. The condition(s) of delivery may include, for example, conditions relating to the physical receipt of the goods by a buyer and/or the acceptance/rejection of the goods by a buyer. For instance, payment can be authorized as a function of a certain percentage of the items pertaining to the transaction being delivered as indicated on an invoice. In this regard, the transaction management system authorizes payment when stored recurring transaction information for the transaction associated with the invoice indicates that delivery has been perfected in a manner consistent with the condition of delivery. In some instances, the transaction management system automatically generates an invoice in response to receiving confirmation of delivery in accordance with conditions of delivery sufficient to authorize payment.

In another example embodiment of the present invention, payment is authorized as a function of timing characteristics associated with the particular recurring transaction. For example, parties to the recurring transaction may agree on a particular payment relationship involving the payment for goods/services at a specified time after performance, or on a particular date for outstanding balances. For instance, where parties agree that a cyclic payment is to be made on the $15^{th}$ of the month, with payments being made for transactions having a particular transaction closing date (e.g., the last day of the previous month).

In other implementations, timing characteristics are related to the performance of the transaction, such as a time of delivery or service. For instance, the amount of payment for the recurring transaction may be predicated by the timing of delivery of goods for the transaction (e.g., with longer delivery times resulting in lower payment). The timing of the performance of a recurring service transaction may be predicated by the date that the service is performed. In this regard, performance characteristics relating to the transactions can be tied to payment.

In another example embodiment of the present invention, a recurring transaction involving a fixed payment is managed with a transaction management system. Transactions to which this approach is amenable include, for example, rental contracts for building space, lease contracts for equipment or automobiles, insurance contracts, service contracts and more. A transaction management system stores characteristics of a recurring transaction for a particular party to a transaction and automatically manages the payment of fees associated with the recurring transaction. In some instances, invoices are automatically generated. In other instances, invoices received are automatically paid. In still other instances, invoices and payments are automatically processed by the transaction management system.

A variable payment approach is used in another implementation, where recurring transaction rules are used to audit invoice-type data in order to authorize an indicated payment. Parties to a transaction agree upon and store transaction-based rules at a transaction management system. These rules include information that can be used by the transaction management system to evaluate a particular payment amount. When invoice-type data is received (or generated) at the transaction management system, the recurring transaction rules associated with the parties to the transaction for which the invoice-type data is generated are used to determine whether a payment can be made and, in some applications, when the payment is to be made.

In some instances, the recurring transaction rules include tolerance (e.g., percentage) information, where payments within a particular range of a target value can be automatically authorized. For example, where a recurring transaction is a utility transaction for heating gas, a target value can be programmed into the transaction management system. This target value can also be tailored to a particular month of the year, with heating-season months generally having a higher target value than non-heating season months. Information used to set the target value may be based on historical data, such as heating gas usage in a previous year, current heating gas prices and average temperature conditions. Recurring transaction rules can be made to automatically approve heating gas invoices within a particular range (e.g., 10%) of target value. The billed amount on a heating gas invoice is processed to determine whether it is within range of a particular target value, with the target value optionally being set using one or more of the above conditions. If the amount billed is within range, the transaction management system automatically authorizes payment. If the amount billed is out of range, payment is not authorized. In some instances, the transaction management system is programmed to pay up to an authorized amount for an out-of range bill. In other instances, the transaction management system is further optionally programmed to automatically flag the invoice-type data for follow-up to determine whether the out of range portion of the bill can be paid.

In another example embodiment of the present invention, the transaction management system interacts with one or more financial institutions for effecting payment. In this regard, the transaction management system uses recurring transaction data for parties to a transaction to determine a condition of payment for a transaction as discussed above. Rules regarding a relationship between a financial institution and a party (e.g., buyer) to the transaction are the used to authorize payment from the financial institution, on behalf of the party to the transaction, to another party (e.g., seller) to the transaction.

In one implementation, the financial institution automatically pays a seller on a cyclic basis as defined by parties to the transaction and in relation to a cyclic nature of goods and/or services pertaining to the transaction. For example, payment from a financial institution to a seller for a cyclic transaction can be effected on a calendar basis (e.g., the $1^{st}$ of each month) using the transaction management system to trigger payment. The financial institution then collects payment from the buyer in one or more of a variety of manners, using the transaction management system or otherwise. In addition, the financial institution can pay multiple sellers in this manner for a particular buyer, with the buyer correspondingly making a single payment to the financial institution for all payable amounts based on the cyclic transaction.

In another example embodiment of the present invention, the transaction management system automatically categorizes components of recurring transactions into expense type categories for the buyer for whom payment is being authorized. For instance, where a recurring transaction involved the purchase of goods and services relating to different types of business expenses, the transaction management system not only manages the recurring nature of the transaction, it also automatically categorizes components of each recurring transaction into expense-related categories. For general information regarding transaction management and for specific information regarding the classification of expenditures to which the recurring management approaches discussed herein may apply, reference may be made to U.S. patent application Ser. No. 11/121,158 entitled "Transaction Accounting Processing System and Approach" and filed on May 7, 2005. This patent document is fully incorporated herein by reference.

According to another example embodiment of the present invention, recurring interactions are managed using an approach that facilitates automatically processing certain interaction data as a function of common characteristics of the data. Interaction data from two sources (e.g., two documents) is compared and common data that is found in both sources is used to define a particular interaction category. Additional sources bearing the common data are thus grouped into the particular interaction category. For each category and, in some instances, for each type of document or sub-category within each category, recurring attributes are managed and monitored, with recurring transactions being used to automatically update related transaction data. With this approach, interaction data is automatically categorized into groups that can be used to identify documents and other interaction data that belongs to a particular interaction. For general information regarding interactions and for specific information regarding transactions and the use of comparison and grouping of interaction data to which one or more example embodiments discussed herein may apply, reference may be made to U.S. patent application Ser. No. 10/864,761 entitled "Automated Transaction Processing System and Approach," filed Jun. 9, 2004 and fully incorporated herein by reference.

Turning now to the figures, FIG. 1 shows a transaction processing arrangement 100, according to another example embodiment of the present invention. The transaction processing arrangement 100 includes a transaction processor 110 having a recurring transaction engine 115 that is configured for processing recurring transaction information and, in some applications, for generating the recurring transaction information on a selected basis. The transaction processor 110 is coupled to a database 112 that is used to store information, including recurring transaction rules 113 and transaction party profile data 114, used by the transaction processor 110 and the recurring transaction engine 115 for processing recurring transactions. The database 112 is selectively implemented using one or more data storage arrangements, which may be located at common or distinct locations and coupled via a network or other communications link.

A plurality of user nodes 120, 122, 124, 126 and 128 are communicatively coupled to the transaction processor 110 for passing transaction-related information. The user nodes include one or more of a variety of transaction parties related to a transaction, such as buyers, sellers, shippers, carriers, financial institutions and regulatory entities. For this example description, the user nodes are implemented as follows: user nodes 120-N represent buyers, 122-N represent sellers, 124-N represent seller financial institutions, 126-N represent buyer financial institutions and 128 represents an administrator that manages and otherwise operates the transaction processor 110.

The recurring transaction engine 115 is programmed to employ the recurring transaction rules 113 stored in the database 112 and/or at one of the user nodes 120-128 to automatically determine a payment-related condition of transactions, such as that related to invoice-type data received via, or generated on behalf of, one of the sellers 122-N. The recurring transaction engine 115 determines whether payment for a recurring transaction is appropriate for a variety of transactions, such as in connection with one or more of the above-discussed approaches to the management and processing of recurring transactions. In this regard, when payment-related data is received (or generated) at the transaction processor 110, the recurring transaction engine 115 automatically associates the payment-related data with one or more of the buyer (120-N) and seller (122-N) parties associated with the transaction using the transaction party profile data 114 in the database 112. For example, when transaction data specifies a particular ID or other data that is assigned to the buyer 120 and the seller 122 (or to a transaction therebetween) in the transaction party profile data 114, the recurring transaction engine 115 associates the transaction data with the buyer and seller.

Using the association, recurring transaction rules 113 for one or more of the buyer, seller and transaction therebetween are implemented by the recurring transaction engine 115 to audit the transaction data for authorizing payment therefor. Payment authorization is thus generally based upon user-defined rules that are stored with the recurring transaction rules 113. For instance, in some applications, the recurring transaction rules 113 specify, for a particular transaction, that payment-related data be compared against stored recurring transaction data to determine a condition relating to the payment for goods and/or services that are the subject of the recurring transaction. If certain conditions (e.g., quantity delivered, approval of delivered goods, percentage of services performed) are met, the recurring transaction engine 115 authorizes payment. If these certain conditions are not met, the recurring transaction engine 115 does not authorize payment. Other conditions upon which payment can be made include, for example, one or more of a payment request date in an invoice, a previous payment date, a previous payment amount, an amount of credit available for use on the buyer's behalf, and a payment request amount in the invoice.

Once payment is authorized, a payment processor 116 uses the authorization to facilitate payment to the seller 122 on behalf of the buyer 120 using transaction party profile data 114 and/or recurring transaction rules 113 applicable to one or both of the buyer and seller. Facilitating payment, in this regard, involves one or more of a variety of functions, depending upon the application; such functions include, for example, one or more of transferring funds, extending credit and sending payment authorization. For instance, where the buyer's profile data stored in the database 112 indicates that payment is to be made from the buyer financial institution 126, and where the seller's similarly-stored profile data indicates that payment is to be made to the seller financial institution 124, the payment processor engine 116 initiates the payment. Where credit is to be extended, an amount of credit available to the buyer is made available via the profile data and used to determine a condition of payment (or ability to pay). The payment to the seller financial institution 124 is made directly from the buyer financial institution 126 or, in some applications (e.g., as programmed at the transaction processor 110), to the administrator 128, which in turn sends payment to the seller financial institution 124. In some applications, one or more of the financial institutions 124-N and 126-N have profile information stored with the transaction party profile data 114 and used by the payment processor 116 to interact therewith for facilitating payment. In other applications, one or more of the financial institutions 124-N and 126-N do not have profile information stored in the database 112, but do have sufficient information stored with particular buyer and/or seller profiles in the database 112 for use by the payment processor 116 in facilitating payment.

A fee processor 117 assesses a fee against one or more transaction parties, on behalf of the administrator 128, for processing the recurring transactions. These fees are assessed, for example, as a function of a transaction amount (e.g., a certain percentage thereof), a flat fee per transaction or a fee per amount of usage by a particular transaction party. For instance, keeping with the example of a recurring transaction between the buyer 120 and the seller 122, the fee processor 117 assesses a fee against the seller 122 (or, if selected, the buyer 120) for processing the transactions, with the fee reflecting each recurrence of the recurring transaction.

In some applications, as discussed in part above, the recurring transaction engine 115 processes payment-related conditions that are generated by the recurring transaction engine 115 at the direction of buyer and seller parties engaging in the recurring transaction. For example, where the buyer 120 and seller 122 agree to recurring transaction terms specifying that a payment be made on the first of each month for a year in a specified amount for a particular good or service, the recurring transaction rules 113 for the recurring transaction specify these terms. Once specified, the recurring transaction engine 115 automatically generates a payment authorization on the first of each month, in the specified amount, every month for a year. Taking this example further, the authorization for the payment may specify that the buyer 120 must agree to the payment before it is made, such that the recurring transaction engine 115 generates a payment authorization on the first of the month, in response to an agreement received from the buyer 120. A variety of such payment-related conditions are thus specifiable by parties to transactions processed by the transaction processor 110, as stored in the recurring transaction rules 113 and used to initiate and/or authorize payment for a recurring transaction.

The database 112 can be used to store transaction-related data that can be tailored for characteristics of specific transactions. The stored transaction-related data may include, for example, transaction party profile data 114 that specifies the identity of parties to the transaction. The recurring transaction rules 113 may specify the identity of the transaction (e.g., transaction-specific number, loan number, and account number), beginning and/or ending payment dates and fixed or flexible payment amounts. In addition, processing data such as that used for determining what criteria is sufficient for authorizing payment and for notification of payment-related timing characteristics (e.g., notice of service acceptance) is selectively stored with the recurring transaction rules 113. In this regard, data for each recurring transaction served by the database can be stored accordingly having data of a specific recurring nature as identified, for example, by timing and processing characteristics.

In some instances, the transaction processor 110 is adapted to automatically exchange data with one or more user nodes, with authorization data being used to control information access at one or both of the transaction processor and the user node(s). For instance, using data source identification (e.g., address) and authorization (e.g., password) information stored with the transaction party profile data 114 at the database 112, the transaction processor 110 can access remote data sources at one or more of the user nodes 120-128. Program information stored at the database 112 is used for extracting information from remote data sources. Extracted information includes, for example, payment-related conditions for recurring transactions, payment initiation information, payment termination information and/or merchant offerings provided to a buyer. A comparison and/or other processing approach involving the extracted information is selectively implemented for auditing aspects of and/or facilitating payment for the transaction.

Using user node 120 as an example and wherein the user node includes a processor and a data source (e.g., the user node 120 is a computer), the transaction processor 110 selectively interacts with the processor at the user node 120 to retrieve information stored at the data source. Similarly, a user a user node 120 can, with proper programming and access authorization, access the database 112 via the transaction processor 110 for retrieving, changing and/or storing data, when a request for such access matches information stored with the transaction party profile data 114.

In another implementation, one or more of the user nodes 120-128 includes a user interface configured for receiving information that can be used for interacting with the transaction processor. The user interface may be generated at the user node (using, e.g., an application program), or generated by the transaction processor 110 and accessible by users at the user nodes via a network such as the Internet. In these applications, the user interface facilitates the exchange of information, such as requests for reports, the storage of profile or transaction rule information in the database 112, or data relating to the provision of an invoice.

A variety of transaction events can be used in initiating payment for a particular recurring transaction, depending upon the particular application. These payment initiating events are stored with the recurring transaction rules 116 in the database 112 and implemented by the recurring transaction engine 115 to initiate a payment request (e.g., to facilitate the processing of a received or generated invoice). One such example transaction between the buyer 120 and the seller 122 has a monthly payment cycle, with the transaction event being the first day of each month. In this regard, on the first day of the month, the recurring transaction engine 115 facilitates the initiation of a payment request. In some applications, the recurring transaction rules 116 simply indicate that payment is to be made in a particular amount on the first of the month. In other applications, the recurring transaction rules 116 specify that payment can be made on the first of the month, when certain other criteria are met. Such criteria include, e.g., the seller 122 providing an invoice, the buyer 120 approving an invoice, the buyer acknowledging the receipt of goods and/or services, or an invoice matching, or falling within a particular tolerance of, a predefined amount. Where a new transaction is initiated, a payment initiation may involve the receipt of a notice of service acceptance by the buyer 120. After a first such payment initiation, the recurring transaction rules 113 are used to generate a recurring payment request on the first day of the month, with this example.

Figure 2:
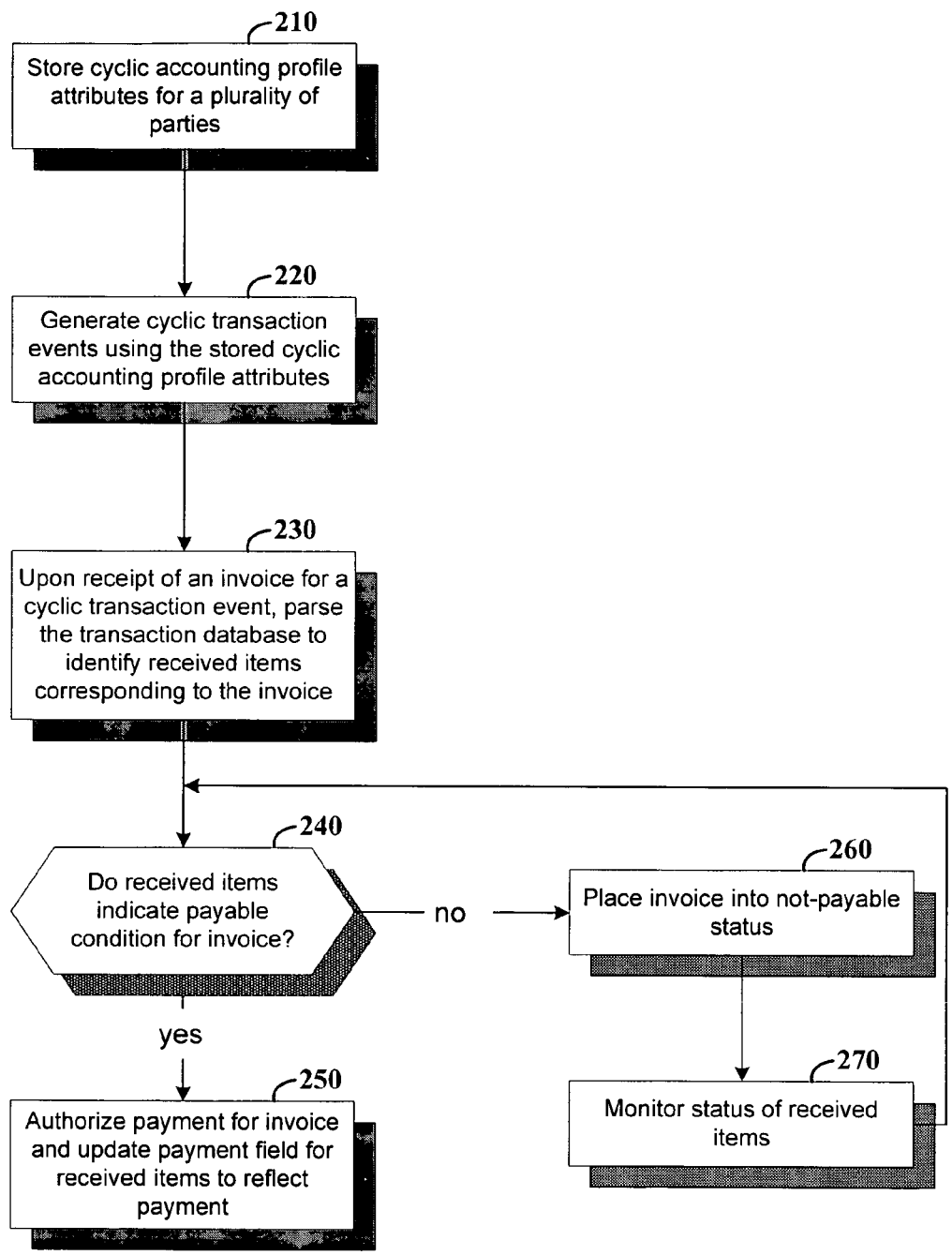
FIG. 2 is a flow diagram showing an approach for recurring transaction management, according to another example embodiment of the present invention.

FIG. 2 is a flow diagram showing an approach for cyclic transaction management, according to another example embodiment of the present invention. The approach shown in FIG. 2 may be implemented, for example, in connection with the transaction processing arrangement 100 shown in FIG. 1.

At block 210, cyclic accounting profile attributes are stored for a plurality of transaction parties such as buyers, sellers and financial institutions via which payment for transactions between buyers and sellers is transferred. These cyclic accounting profile attributes are stored in a database arrangement. Cyclic transaction events are generated using the stored cyclic accounting profile attributes at block 220. These accounting profile attributes may specify, for example, conditions upon which a transaction event such as a payment initiation is generated (e.g., a date, the receipt of a particular set of data from a transaction party such as a receipt for goods and/or services, or quantity data indicating that a particular item is below a specified level and reorder is appropriate).

Upon receipt of an invoice for a cyclic transaction event at block 230, the transaction database is parsed to identify received items corresponding to the invoice. That is, where an invoice specifies a particular item for which payment is requested, the database is parsed to identify corresponding items. In this regard, if received items in the database indicate a payable condition for the invoice at block 240 (i.e., items for which payment is requested on the invoice have been delivered), payment for the invoice is authorized at block 250. In addition, once payment is authorized and also in connection with block 250, a payment field is updated to reflect the payment for the received items in the database.

If the received items as indicated in the database do not indicate a payable condition for an invoice at block 240, the invoice is placed into a not-payable status at block 260. Such a not-payable status is generally maintained together with the invoice data until such time as the invoice becomes payable. In this regard, the status of the received items as stored in the database is monitored at block 270 and, when the received items indicate a payable condition for the invoice at block 240, payment is facilitated at block 250 as discussed above.

In some applications, and again referring to FIG. 2, payment for a partial amount of items (or services) indicated on an invoice is facilitated at block 250, with payment for other items placed in a not-payable status at block 260. For instance, where an invoice specifies an amount that covers more than an amount of goods received for a particular transaction, payment for a received portion of the goods is facilitated while payment for goods that have not been received is delayed until the receipt thereof. Similarly, where an invoice specifies payment for more than one recurrence in a recurring transaction, payment can accordingly be authorized as a function of each recurrence happening (i.e., in response to the delivery of goods and/or services corresponding to a particular recurrence). For instance, when a particular recurring transaction specifies that a seller is to deliver a set amount of a particular good on the first of each month for one year, a single invoice from the seller can be used to facilitate payment for the transaction. When delivery of each recurrence is reflected in received item data in the database, payment for that recurrence is authorized while payment for any remaining recurrences is withheld.

Figure 3:
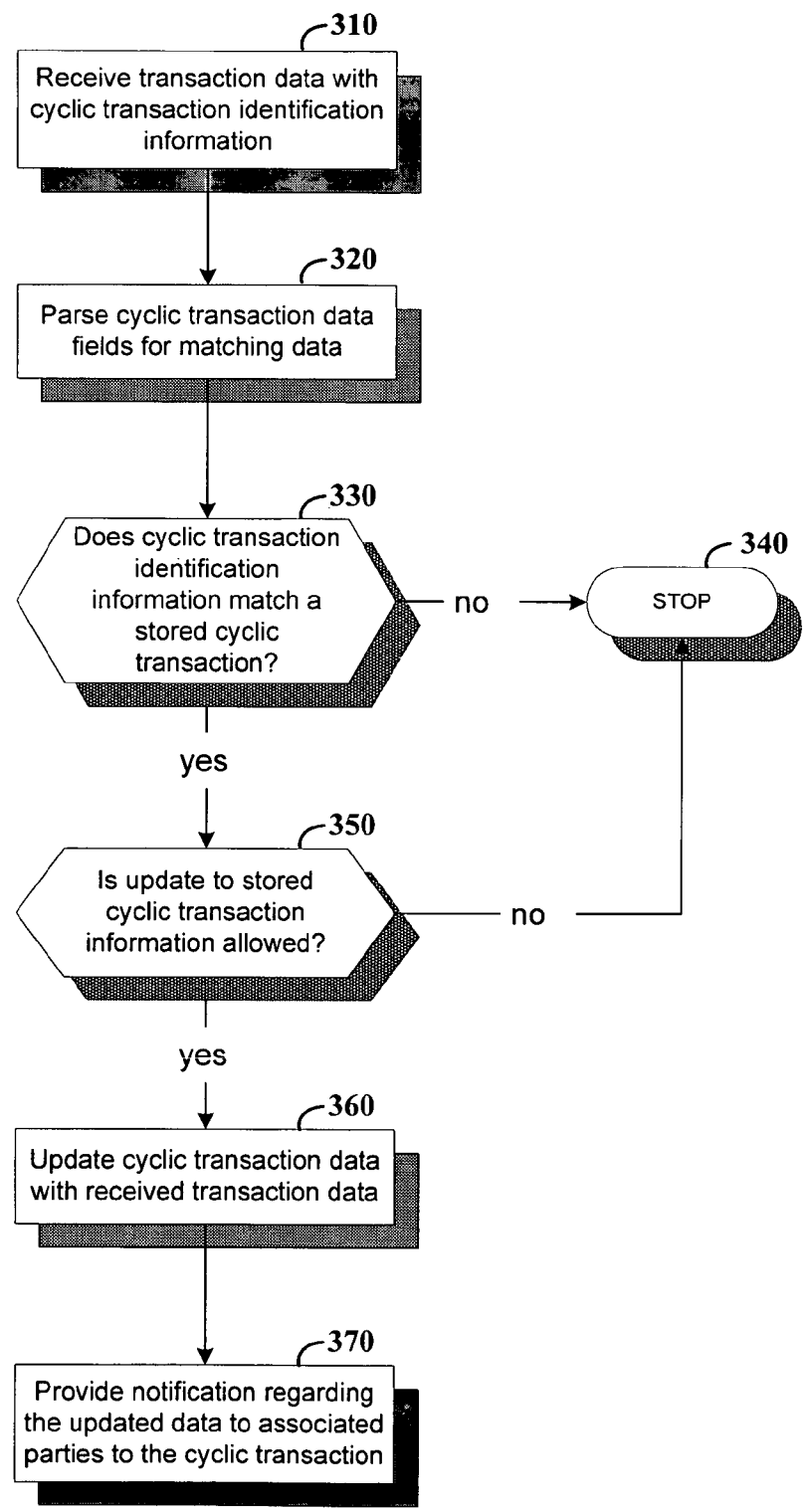
FIG. 3 is another flow diagram for the management of cyclic transaction data, according to another example embodiment of the present invention.

FIG. 3 is another flow diagram showing an approach to the management of recurring transaction data, with recurring data of a cyclic nature discussed by way of example, according to another example embodiment of the present invention. The approach shown in FIG. 3 may be implemented, for example, in connection with the transaction processing arrangement 100 shown in FIG. 1, for storing and/or updating information such as the recurring transaction rules 113 or other transaction-specific quantity, price or recurrence data, stored in the database 112.

At block 310, transaction data having cyclic transaction identification information is received and cyclic transaction data fields (e.g., stored in a database) are parsed for data that matches the received data at block 320. The identification information includes, for example, buyer or seller identification numbers, a transaction identification number or other information that can be used for associating the transaction data with a particular transaction. If the cyclic transaction identification information does not match stored cyclic transaction data in the data fields at block 330, the process stops at block 340. If there is such a match at block 330, but an update to the stored cyclic transaction information is not allowed (e.g., if the information received at block 310 does not have proper authorization or if access to the stored information is somehow restricted) at block 350, the process stops at block 340.

If there is a match at block 330 and updates are allowed at block 350, the stored cyclic transaction data is updated at block 360 with the transaction data received at block 310. In some applications, notification regarding the update data is provided to associated parties to the cyclic transaction at block 370.

Figure 4:
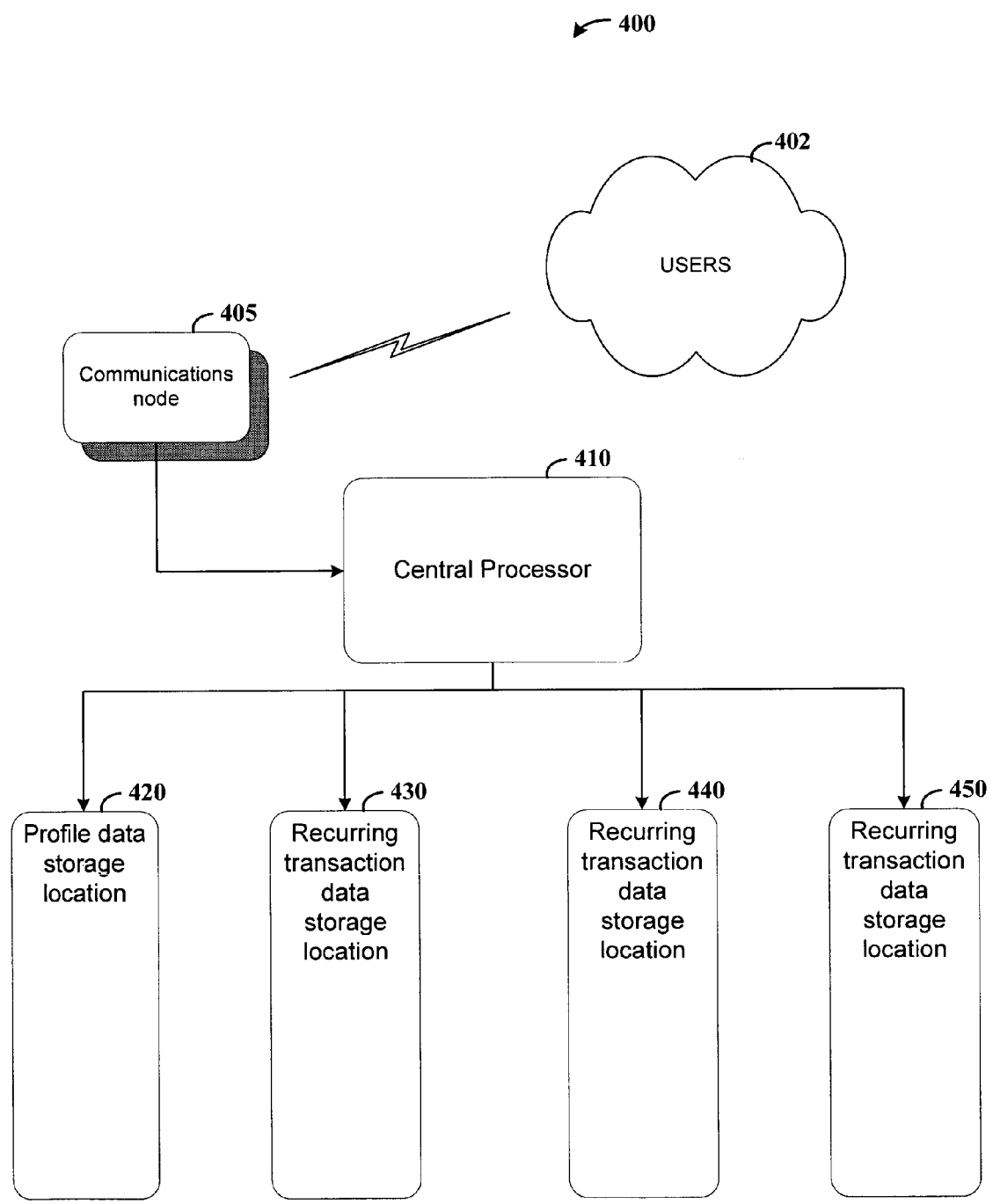
FIG. 4 is a block diagram showing a storage arrangement for storing and processing cyclic transaction information, according to another example embodiment of the present invention.

FIG. 4 is a block diagram showing a storage arrangement 400 for storing and processing recurring transaction information, according to another example embodiment of the present invention. A central processor 410 interacts with users 402 via a communications node 405 for receiving and storing transaction data upon which transactions are processed, for receiving information indicating a payment event, for facilitating payment for transactions or for interacting with a variety of users in the facilitation of recurring transactions. For instance, as discussed in connection with FIG. 1, interactions with users 402 via the communications node 405 may involve direct users such as buyers and sellers or indirect users such as financial institutions. In general, the user interaction involves initial interaction for establishing rules or profile information. In addition, the user interaction also typically involves the generation and/or communication of invoice data for recurring transactions. In some applications, the user interaction also involves the communication of updates for updating stored information, of receipts to acknowledge receipt of goods and/or services or of information such as stock quantity that can be used in processing recurring transactions.

The central processor 410 controls the storage of and access to recurring transaction data at storage locations 420, 430, 440 and 450. The storage location 420 is used to store profile information for transaction parties, as applicable to different transactions in which the parties are involved. Each of the storage locations 430-450 is assigned to a particular recurring transaction, with data associated with the particular recurring transaction stored therewith, and including information specifying one or more profiles, in the storage location 420, that apply to the particular recurring transaction.

The data stored in the cyclic transaction data storage locations 430-450 generally includes sufficient information for facilitating payment for recurrences of a particular cyclic transaction, such as information identifying a recurring date or other event at which payment is to be processed, as well as data identifying parties and, ultimately, payment conditions. In some applications, where appropriate, other cyclic transaction data such as order amounts, thresholds, stock levels and others as discussed herein are stored with the cyclic transaction data storage locations 430-450.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. A transaction-processing system for processing a plurality of recurring transactions involving merchant offerings among parties including buyers and sellers, the system comprising:

a transaction databank arrangement and a computer arrangement, wherein the transaction databank arrangement and the computer arrangement are both remote from the buyers and the sellers, and wherein, for each particular recurring transaction from the plurality of recurring transactions:

the particular recurring transaction is between a particular buyer and a particular seller, the transaction databank arrangement stores data representing billed quantities of merchant offerings for the particular recurring transaction, and the computer arrangement:

receives transaction-based data from the particular buyer and the particular seller, stores the received transaction-based data in the transaction databank arrangement, the transaction-based data including conditions upon which payment for invoices can be selectively authorized for the particular recurring transaction on behalf of the particular buyer, receives an electronic communication including data representing an invoice for the particular recurring transaction from the particular seller, the electronic communication being devoid of any identification for the particular recurring transaction that is provided to the particular seller by the particular buyer, audits a payment of the invoice as a function of data in the invoice and the conditions upon which payment for invoices can be authorized for the particular recurring transaction, authorizes the payment of the invoice as a function of the audit of payment of the invoice, and updates the data representing the billed quantities of the merchant offerings for the particular recurring transaction in the transaction databank arrangement to include a billed quantity of merchant offerings in the invoice, the billed quantity of merchant offerings in the invoice representing a quantity of items from the invoice for which payment is authorized.

2. The system of claim 1, wherein the computer arrangement:

determines a condition of payment maturity of the invoice, audits the payment of the invoice by:

auditing quantities of merchant offerings specified in the invoice against data representing historical billed and paid quantities of merchant offerings stored in the transaction databank arrangement for the particular recurring transaction, and approving payment for the quantities of merchant offerings specified in the invoice in response to an indication that the quantities of merchant offerings specified in the invoice have not been previously billed and paid, and in response to the payment of the invoice being determined premature:

stores the invoice, monitors the condition of payment maturity, and when payment for the invoice is determined to be mature:

authorizes the payment of the invoice, and updates the data representing the historical billed and paid quantities of merchant offerings for the particular recurring transaction to include the quantities of merchant offerings in the invoice.

3. The system of claim 1, wherein the computer arrangement:

audits the payment of the invoice by automatically determining whether a quantity of merchant offerings has been previously billed and paid and to approve the payment of the invoice responsive thereto, and audits and authorizes the payment of the invoice independent of any identification for the particular recurring transaction that is provided to the particular seller by the particular buyer.

4. The system of claim 1, wherein:

the transaction databank arrangement stores delivery data indicative of a delivered transaction item quantity, and the computer arrangement audits the payment of the invoice by comparing transaction item quantity data from the invoice with the delivery data, and the computer arrangement authorizes the payment of the invoice in response to the audit of the payment of the invoice indicating that the transaction item quantity from the invoice has been delivered.

5. The system of claim 1, wherein:

the transaction databank arrangement stores information specifying a termination condition for terminating the particular recurring transaction, and the computer arrangement terminates the particular recurring transaction as a function of the termination condition.

6. The system of claim 1, wherein:

the transaction databank arrangement includes fee information for assessing a fee for processing the particular recurring transaction, and the computer arrangement assesses the fee for processing the particular recurring transaction against one of the particular buyer and the particular seller.

7. The system of claim 1, wherein the computer arrangement:

interacts with remote processing arrangements to extract information specifying payment-related conditions for the particular recurring transaction, and authorizes the payment of the invoice as a function of the payment-related conditions for the particular recurring transaction.

8. The system of claim 7, wherein the computer arrangement:

extracts information from the particular seller that specifies merchant offerings provided to the particular buyer in connection with the particular recurring transaction, audits the payment of the invoice by comparing the merchant offerings provided to the particular buyer in connection with the particular recurring transaction with the conditions upon which payment for invoices can be selectively authorized for the particular recurring transaction, and authorizes the payment of the invoice by authorizing payment for the specified merchant offerings as a function of the audit.

9. The system of claim 1, wherein:

the transaction databank arrangement stores information specifying a payment initiation condition for the particular recurring transaction, and the computer arrangement initiates a recurring payment for the particular recurring transaction as a function of the payment initiation condition.

10. The system of claim 1, wherein the computer arrangement:

audits the payment of the invoice in part by comparing a billed amount in the invoice with specified conditions that indicate an acceptable range of billed amounts, and authorizes the payment of the invoice as a function of the audit of the payment of the invoice by:

authorizing the payment of the invoice in response to the billed amount in the invoice falling in the acceptable range of billed amounts, and denying the payment of the invoice in response to the billed amount in the invoice falling outside the acceptable range of billed amounts.

11. The system of claim 1, wherein the computer arrangement audits the payment of the invoice as a function of at least one of:

a payment request date in the invoice, a previous payment date, a previous payment amount, an amount of credit available for use on behalf of the particular buyer, and a payment request amount in the invoice.

12. The system of claim 1, wherein the computer arrangement:

receives transaction-based data including proposed recurring transaction conditions from the particular seller, receives transaction-based data including a notice of service acceptance of the proposed recurring transaction conditions from the particular buyer, and audits the payment of the invoice as a function of the notice of service acceptance being received.

13. A method for processing recurring transactions involving merchant offerings among parties including buyers and sellers, the method being implemented by data-processing circuitry and comprising:

storing information for a plurality of recurring transactions between buyers and sellers in a transaction databank arrangement that is remote from the buyers and the sellers, wherein for each particular recurring transaction from the plurality of recurring transactions:

the particular recurring transaction is between a particular buyer and a particular seller, the stored information for the particular recurring transaction includes data representing billed quantities of merchant offerings for the particular recurring transaction and data associated with conditions upon which payment for invoices can be selectively authorized on behalf of the particular buyer, and using at least one data-processing circuit for:

receiving transaction-based data from the particular buyer and the particular seller, storing the received transaction-based data in the transaction databank arrangement, the transaction-based data including conditions upon which payment for invoices can be selectively authorized for the particular recurring transaction, receiving an electronic communication including data representing an invoice for the particular recurring transaction from the seller, the electronic communication being devoid of any identification for the particular recurring transaction that is provided to the particular seller by the particular buyer;

auditing a payment of the invoice as a function of data in the invoice, the billed quantities of merchant offerings for the particular recurring transaction and the conditions upon which payment for invoices can be selectively authorized on behalf of the buyer, authorizing the payment of the invoice as a function of the audit, and updating the data representing the billed quantities of merchant offerings for the particular recurring transaction in the transaction databank arrangement to include a billed quantity of merchant offerings in the invoice, the billed quantity of merchant offerings representing a quantity of items from the invoice for which payment is authorized.

14. The method of claim 13, further comprising:

determining a condition of payment maturity of the particular recurring transaction, and in response to the payment for the invoice being determined premature:

storing the invoice, monitoring the condition of payment maturity for the particular recurring transaction, and when the payment for the invoice is determined to be mature:

authorizing the payment of the invoice, and updating the data representing the billed quantities of merchant offerings for the particular recurring transaction in the transaction databank arrangement to include the billed quantity of merchant offerings in the invoice.

15. The method of claim 13, wherein the method further comprises:

extracting information specifying payment-related conditions for the particular recurring transaction from a remote processing arrangement, extracting, from the particular seller, information that specifies merchant offerings provided to the particular buyer in connection with the particular recurring transaction, wherein auditing the payment of the invoice comprises comparing the extracted specified merchant offerings with the payment-related conditions for the particular recurring transaction, and wherein authorizing the payment of the invoice comprises authorizing payment for the extracted specified merchant offerings as a function of the audit, wherein the auditing of the payment of the invoice and authorizing the payment of the invoice is performed independent of any identification for the particular recurring transaction that is provided to the seller by the buyer.

16. The method of claim 13, wherein auditing the payment of the invoice comprises auditing the payment of the invoice as a function of at least one of:
a payment request date in the invoice,
a previous payment date,
a previous payment amount,
an amount of credit available for use on behalf the particular buyer, and
a payment request amount in the invoice.

17. A transaction-processing system for processing a plurality of recurring transactions involving merchant offerings among parties including buyers and sellers, different ones of the recurring transactions involving different ones of the buyer and sellers, the system comprising a data storage arrangement, a recurring transaction engine, a payment processor, and a fee processor, wherein for each particular recurring transaction in the plurality of recurring transactions:
the particular recurring transaction is between a particular buyer and a particular seller,
the data storage arrangement stores transaction-based data for the particular recurring transaction, the transaction-based data for the particular recurring transaction including profile information for at least one of the particular buyer and the particular seller, data for identifying financial institutions for implementing the processing of payment for the particular recurring transaction, and data for associating invoices with transaction rules specifying conditions upon which payment for the invoices can be selectively authorized for the particular recurring transaction,
in response to receiving a notice of service acceptance from the particular buyer in the particular recurring transaction, the recurring transaction engine:
receives electronic communications including data representing invoices for the particular recurring transaction from the particular seller, the electronic communications being devoid of any identification for the particular recurring transaction that is provided to the particular seller by the particular buyer,
associates the invoices with the transaction rules as a function of profile information for the particular recurring transaction,
audits each associated invoice against the transaction rules associated therewith,
authorizes payments for each associated invoice as a function of the audit, and
updates stored data characterizing billed quantities for the particular recurring transaction to include a billed quantity in the invoices for which payment is authorized,
the payment processor interacts with a financial institution specified in the profile information stored in the data storage arrangement for the recurring transaction to facilitate payment in response to payment authorization from the recurring transaction engine; and
the fee processor assesses a fee against at least one of the particular buyer and the particular seller for processing the particular recurring transaction.

18. The system of claim 17, wherein the recurring transaction engine:
accesses a remote database implemented by one of the particular buyer and the particular seller,
extracts, from the remote database, data upon which payment for the particular recurring transaction can be authorized, and
audits each of the invoices associated with the particular recurring transaction against the transaction rules by auditing each of the invoices against the extracted data.

19. The system of claim 17, wherein the recurring transaction engine terminates processing and payment authorization for the particular recurring transaction in response to a transaction termination condition.

20. For use in processing a plurality of recurring business-to-business electronic transactions at a central location that is independent from buyers and sellers in the transactions, a computer-based system for storing and using buyer and seller profile data, data representing historical billed and paid quantities of merchant offerings, and buyer-specified data upon which data in seller-provided invoices can be audited and paid, the computer-based system comprising a central transaction databank arrangement and a computer processor,
wherein the central transaction databank arrangement is located remote from the buyers and the sellers involved in the recurring transactions,
wherein the central transaction databank arrangement stores said profile and buyer-specified data; and
for each particular recurring transaction from the plurality of recurring transactions:
the particular recurring transaction is between a particular buyer and a particular seller,
the central transaction databank arrangement stores historical billed quantities of merchant offerings for the particular recurring transaction, and
the computer processor:
receives transaction-based data from the particular buyer and the particular seller,
stores the received transaction-based data in the central transaction databank arrangement, the transaction-based data including conditions upon which payment for invoices can be selectively authorized for the particular recurring transaction,
receives an electronic communication including data representing an invoice for the particular recurring transaction from the seller, the electronic communication being devoid of any identification for the particular recurring transaction that is provided to the seller by the buyer;
audits a payment of the invoice as a function of data in the invoice, the stored profile data for the particular buyer and the particular seller, the stored data regarding historical billed and paid quantities of merchant offerings for the particular recurring transaction, and the conditions upon which payment for invoices can be selectively authorized for the particular recurring transaction,
authorizes the payment of the invoice as a function of the audit, and
updates the data representing the billed and paid quantities of merchant offerings for the particular recurring transaction to include a billed quantity of merchant offerings in the invoice, the billed quantity of merchant offerings in the invoice representing a quantity of items from the invoice for which payment is authorized.

* * * * *